Dec. 10, 1968 — A. M. CHWASTYK — 3,415,593
OPTICAL PHASE SHIFTER
Filed Dec. 3, 1964

ADOLPH M. CHWASTYK
INVENTOR.

BY Claude Funkhouser
ATTORNEY

United States Patent Office 3,415,593
Patented Dec. 10, 1968

3,415,593
OPTICAL PHASE SHIFTER
Adolph M. Chwastyk, Silver Spring, Md., assignor to the United States of America as represented by the Secretary of the Navy
Filed Dec. 3, 1964, Ser. No. 415,824
4 Claims. (Cl. 350—285)

The present invention relates generally to phase shifting networks and more particularly to an improved optical phase shifter for selectively shifting the phase of a beam of spatially and temporally coherent light.

The increasing complexity of modern technology creates a constant need for simpler, quicker, and more reliable means for performing desired functions than heretofore available.

Man began to look to optical systems for solutions to his problems at an early date because of the inherent speed and simplicity of these systems. However, the use of optical systems was greatly hindered due to the unavailability of a source of coherent light.

The development of the laser, with its spatially and temporally coherent output, provided the needed impetus to the further development and use of optical systems. Rapid advancement in the art of electro-optical data processing developed a need for a means of shifting the phase of light signals, and it was in response to this need that the instant invention was developed.

Accordingly, it is an object of the present invention to provide means for shifting the phase of a spatially and temporally coherent light beam.

Another object of this invention is to provide means for selectively shifting the phase of discrete light beams incident upon an aperture plate.

Still another object of this invention is to provide optical means for shifting the phase of a spatially and temporally coherent light beam.

A further object of the present invention is to provide optical means for selectively shifting the phase of a plurality of discrete coherent light beams.

It is a still further object of the present invention to optically selectively phase shift a plurality of discrete light beams through the principle of variable optical path length.

The attendant advantages of this invention will be better appreciated and said invention will become clearly understood by reference to the following detailed description when considered in conjunction with the accompanying drawings, illustrating one embodiment of the instant invention, wherein.

Figures 1, 2:
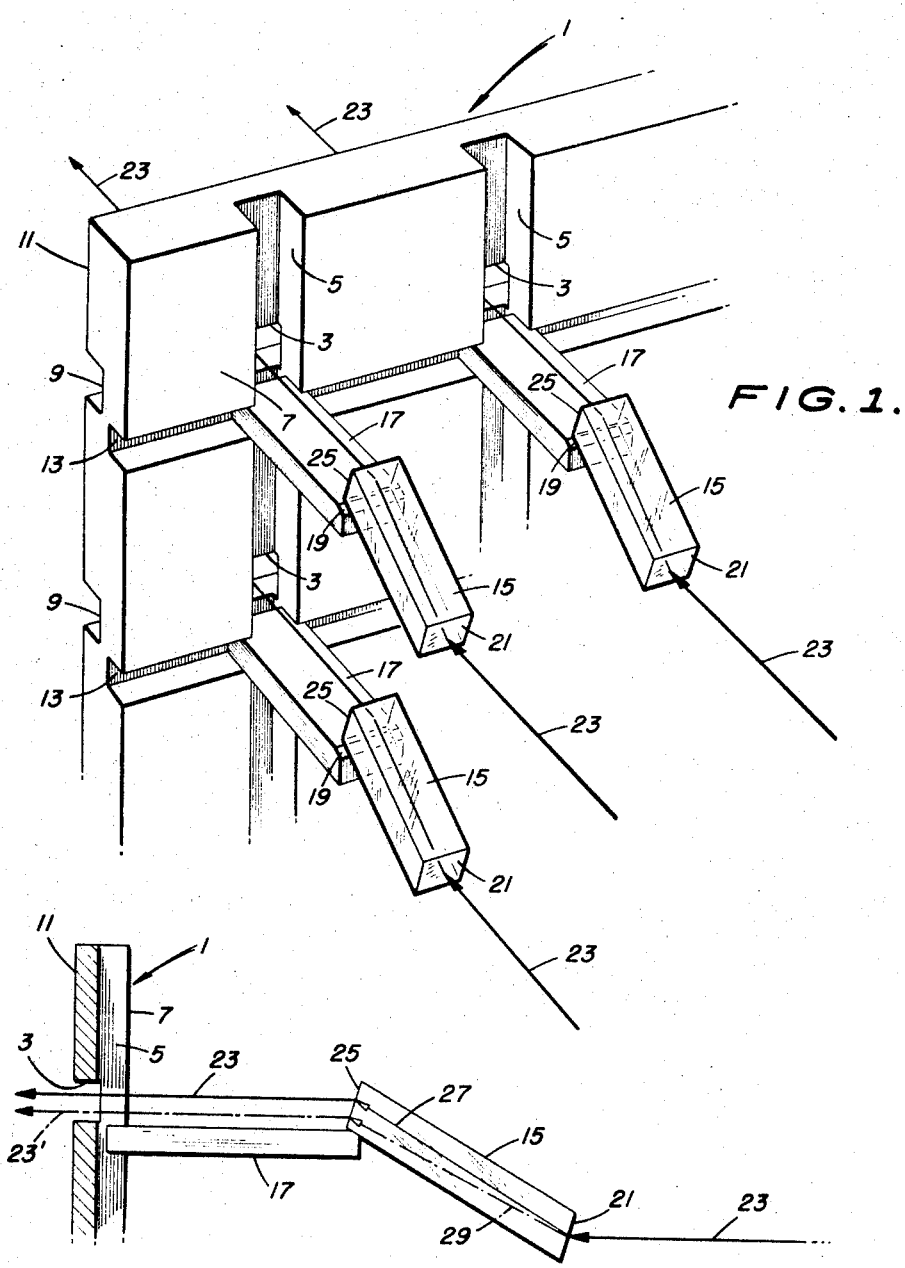
FIG. 1 is a pictorial representation of this invention.
FIG. 2 is a side elevation of a single aperture, and its associated prism, partly in section.

Referring to the drawings in more detail, and more particularly to FIG. 1, an aperture plate is shown at 1, and includes a plurality of discrete spaced apertures 3. The apertures 3 are formed by cutting a plurality of vertical spaced slots 5, in the front face 7 of the aperture plate 1, to a depth of more than half the thickness of said aperture plate. A plurality of spaced horizontal slots 9 are cut in the rear face 11 of the aperture plate 1, to a depth sufficient to intersect said vertical spaced slots 5, and the apertures 3 are formed at the intersections of said vertical slots 5 and said horizontal slots 9.

A plurality of spaced horizontal slots 13 are cut in the face 7 of the aperture plate 1 so that their uppermost surfaces are slightly lower than the lowermost surfaces of the slots 9.

A plurality of parallelepiped shape prisms are shown at 15, and serve to effectively provide the phase shifting medium. A plurality of parallelepiped shape piezoelectric crystals, such as barium titanate crystals, are shown at 17 each having one end portion thereof tightly inserted in one of the slots 13 beneath a discrete aperture 3. The end portions 19 of the crystals 17 extend outwardly of the face 7 of the aperture plate 1, and are each beveled so as to suitably receive one end portion of a discrete prism 15.

The prisms 15 are secured to the crystals 17 in a well-known manner so that the light beams 23 entering the end faces 21 of the prisms 15 will be transmitted through the apertures 3. It is to be emphasized at this point that the end faces 21 and 25 of the prisms 15 are parallel. Accordingly, light entering the prisms through their end faces 21 will emerge parallel to its path of incidence.

The light beams 23 are made to selectively illuminate the apertures 3 in a well-known manner (and in accordance with the shuttering principles set forth in U.S. Patent No. 2,281,280).

The manner of phase shifting the light beams 23 will now be described in detail. It is well-known in the art that light travels at a different speed in different mediums, ergo the velocity of the light beams 23 in the prisms 15 will differ from that of said light beams 23 in the ambient atmosphere. In consequence thereof, the phase of the light beams 23 will change according to the length of time they travel at a different velocity from that which they have in the ambient atmosphere. The time that the said light beams 23 will travel at a changed velocity will depend upon the length of the optical path the said light beams 23 will traverse in passing through the prisms 15.

Referring now to FIG. 2, it is seen that the light beam 23 incident on the face 21 of the prism 15 will travel through the prism along a path 27. An electrical signal is applied to the crystal 17 in a well-known manner (the aperture plate 1 can serve as a ground), and the crystal is forced to distort (not shown) consequently rotating the prism 15 a small amount. The small rotation of the prism 15 will cause the angle of incidence of the light beam 23 on the prism face 21 to change. Accordingly, the angle of refraction of the light beam 23 will change, and the said light beam 23 will traverse the prism via a new optical path 29. The length of the path 29 will differ from that of the path 27 resulting in a phase shift between the light beams 23 and 23' emerging from the face 25 of the prism 15. However, the paths of the beams 23 and 23' will still be parallel, and both said beams will pass through the aperture 3.

The points of incidence of the light beam 23 on the prism face 21, in both the normal and rotated positions of the prism 15, have not been distinguished. The rotation of the prism 15 is so slight that for the purposes of this discussion the changing point of incidence need not be considered.

It is to be further emphasized that all of the crystals 17 are independently connected to a signal source (not shown) and can be selectively controlled in a well-known manner. The selective control of each of the crystals 17 enables the selective phase shifting of each of the discrete light beams 23. The input signal to each of the crystals 17 is variable thereby varying the degree of distortion of each of said crystals 17 that can be obtained. Consequently the light beams 23 can be independently selectively phase shifted a variable amount.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims the instant invention may be practised in a manner otherwise than is specifically described herein.

What is claimed is:

1. An optical phase shifter, including
an aperture plate comprising a plurality of spaced vertical slots in one face thereof and a plurality of spaced first horizontal slots in the opposite face thereof, said first horizontal slots intersecting said vertical slots so as to form a plurality of spaced apertures at said intersections, said aperture plate further comprising a plurality of spaced second horizontal slots in the same face as said vertical slots and having their uppermost surfaces beneath the lowermost surfaces of said first horizontal slots,
a plurality of piezoelectric crystals each inserted into one of said second horizontal slots beneath one of said apertures, and
a plurality of parallelepiped shape prisms each secured to one of said piezoelectric crystals such that movement of a piezoelectric crystal will change the angle of incidence of a light beam directed at its associated prism causing a shift in the phase of such light beam.

2. An optical phase shifter, comprising
an aperture plate having a plurality of spaced apertures therein,
a plurality of piezoelectric crystals each secured to said aperture plate beneath one of said apertures, and
a plurality of prisms each secured to one of said piezoelectric crystals such that light impinging on said prisms will pass through said apertures, said prisms capable of being selectively moved by said piezoelectric crystals whereby the angle of incidence of light impinging on said prisms will be selectively changed to cause said light to undergo a phase shift in passing through said prisms.

3. An optical phase shifter, including
an aperture plate having a plurality of spaced apertures therein,
a plurality of prisms connected to said aperture plate such that light impinging on each of said prisms will be transmitted through a discrete aperture in said aperture plate, and
means for selectively moving each of said prisms for effecting a change in the angle of incidence of light impinging thereon so as to result in a shift in the phase of such light relative to its phase prior to its passage through said prisms.

4. In a device for selectively and variably changing the phase of a plurality of discrete light beams the combination, comprising
an aperture plate having a plurality of aligned spaced apertures therethrough,
a plurality of piezoelectric crystals each secured to said aperture plate beneath one of said apertures, and
a plurality of prisms each secured to one of said piezoelectric crystals whereby when electrical signals activate and distort said crystals, said prisms will be caused to rotate and change the phase of light beams transmitted through them.

References Cited

UNITED STATES PATENTS

| | | | |
|---|---|---|---|
| 2,465,898 | 3/1949 | Martin | 88—61 |
| 3,102,203 | 8/1963 | McNaney. | |
| 3,110,824 | 11/1963 | Flanagan | 88—61 |
| 3,146,367 | 8/1964 | McNaney | 88—10 |
| 3,202,052 | 8/1965 | Rambauske et al. | 88—61 |
| 3,331,651 | 7/1967 | Sterzer | 350—96 |

JEWELL H. PEDERSEN, *Primary Examiner.*

R. L. WIBERT, *Assistant Examiner.*